United States Patent
Rätzsch et al.

(10) Patent No.: US 7,208,540 B2
(45) Date of Patent: *Apr. 24, 2007

(54) PROCESS FOR CURING AMINOPLAST RESINS

(75) Inventors: Manfred Rätzsch, Wilhering/Thalheim (AT); René Dicke, Linz (AT); Daniel Jocham, Linz (AT)

(73) Assignee: Agrolinz Melamin GmbH, Linz (AT)

( * ) Notice: Subject to any disclaimer, the term of this patent is extended or adjusted under 35 U.S.C. 154(b) by 367 days.

This patent is subject to a terminal disclaimer.

(21) Appl. No.: 10/450,640

(22) PCT Filed: Dec. 12, 2001

(86) PCT No.: PCT/EP01/14582

§ 371 (c)(1), (2), (4) Date: Nov. 3, 2003

(87) PCT Pub. No.: WO02/48261

PCT Pub. Date: Jun. 20, 2002

(65) Prior Publication Data

US 2005/0020750 A1 Jan. 27, 2005

(30) Foreign Application Priority Data

Dec. 15, 2000 (AT) .................. A 2088/2000

(51) Int. Cl.
C08K 3/36 (2006.01)

(52) U.S. Cl. ............ 524/445; 524/406; 524/408; 524/413; 524/417; 524/435; 524/437; 524/444; 525/509

(58) Field of Classification Search ........ 524/445, 524/406, 408, 413, 417, 435, 437, 444; 525/509
See application file for complete search history.

(56) References Cited

U.S. PATENT DOCUMENTS

| | | | |
|---|---|---|---|
| 2,807,595 A | 9/1957 | Brown | |
| 3,912,532 A | 10/1975 | Simone | |
| 3,957,718 A | 5/1976 | Pochert et al. | |
| 4,180,488 A | 12/1979 | Stern et al. | |
| 4,334,971 A | 6/1982 | Mahnke et al. | |
| 4,346,178 A * | 8/1982 | Economou | 501/148 |
| 4,349,660 A | 9/1982 | Toivonnen | |
| 4,472,538 A | 9/1984 | Kamigaito et al. | |
| 4,485,203 A * | 11/1984 | Hutchinson | 524/414 |
| 4,558,075 A | 12/1985 | Suss et al. | |
| 4,683,259 A * | 7/1987 | Goodman | 524/447 |
| 4,889,885 A * | 12/1989 | Usuki et al. | 524/445 |
| 5,102,923 A | 4/1992 | Porosoff et al. | |
| 5,162,487 A | 11/1992 | Weiser et al. | |
| 5,356,938 A * | 10/1994 | Weiser et al. | 521/40 |
| 5,866,645 A | 2/1999 | Pinnavaia et al. | |
| 5,866,654 A | 2/1999 | Fuss et al. | |
| 5,939,515 A * | 8/1999 | Guenther et al. | 528/254 |
| 5,942,598 A | 8/1999 | Iwa et al. | |
| 5,948,156 A * | 9/1999 | Coutelle et al. | 106/486 |
| 5,955,535 A | 9/1999 | Vaia et al. | |
| 6,096,803 A | 8/2000 | Pinnavaia et al. | |
| 6,166,278 A * | 12/2000 | Engelhardt et al. | 585/259 |
| 6,215,024 B1 * | 4/2001 | Choudary et al. | 564/138 |
| RE37,385 E * | 9/2001 | Okada et al. | 524/789 |
| 6,838,509 B2 * | 1/2005 | Shimo et al. | 524/447 |
| 7,012,108 B2 | 3/2006 | Ratzsch et al. | |
| 2002/0041972 A1 * | 4/2002 | Nakamura et al. | 428/516 |
| 2004/0054034 A1 | 3/2004 | Ratzsch et al. | |

FOREIGN PATENT DOCUMENTS

| | | |
|---|---|---|
| CA | 2000472 | 4/1990 |
| DE | 1 054 232 | 4/1959 |
| DE | 1 250 584 | 9/1967 |
| DE | 196 44 930 | 3/1998 |
| EP | 0 017 671 A1 | 10/1980 |
| EP | 0 037 470 A1 | 10/1981 |
| EP | 0 093 965 A2 | 11/1983 |
| EP | 0 149 652 B1 | 7/1985 |
| EP | 0 408 947 A2 | 1/1991 |
| EP | 0 484 245 | 5/1992 |
| EP | 0 822 163 | 2/1998 |
| EP | 1 038 834 | 9/2000 |
| EP | 1 038 913 | 9/2000 |
| JP | 52-33931 | 3/1977 |
| JP | 57-200454 | 12/1982 |
| JP | 58-217424 | 12/1983 |

(Continued)

OTHER PUBLICATIONS

International Search Report of PCT/EP01/14582, dated Jun. 6, 2002.

(Continued)

Primary Examiner—Vasu Jagannathan
Assistant Examiner—Sandra Poulos
(74) Attorney, Agent, or Firm—Christie, Parker & Hale, LLP

(57) ABSTRACT

Aminoplast resins are cured using inorganic particles as curing agents. The inorganic particles have a laminated structure and include interlamellarly exchangeable cations such as alkali cations, alkaline-earth cations, aluminum cations, iron cations and/or manganese cations. The aminoplast resins may be cured to produce semi-finished products and molding materials.

11 Claims, No Drawings

FOREIGN PATENT DOCUMENTS

| | | |
|---|---|---|
| JP | 4-305005 | 10/1992 |
| JP | 04-335045 | 11/1992 |
| JP | 10-81808 | 3/1998 |
| JP | 11-323106 | 11/1999 |
| JP | 2000-191925 | 7/2000 |
| RU | 2 154 073 | 8/2000 |
| WO | WO 93/04117 | 3/1993 |
| WO | WO 95/14733 | 6/1995 |
| WO | WO 96/20230 | 7/1996 |
| WO | WO 96/20239 | 7/1996 |
| WO | WO 00/09571 | 2/2000 |
| WO | WO 00/09605 | 2/2000 |
| WO | WO 00/24818 | 5/2000 |
| WO | WO 00/44669 | 8/2000 |
| WO | WO 00/49072 | 8/2000 |
| WO | WO 01/04205 | 1/2001 |
| WO | WO 02/48248 A2 | 6/2002 |
| WO | WO 02/48270 A1 | 6/2002 |

OTHER PUBLICATIONS

International Preliminary Examination Report of PCT/EP01/14582, dated Mar. 18, 2003.
Ullmann's Encyclopedia of Industrial Chemistry, 5th edition, vol. A2, pp. 115-141.
Woebcken, "Kunststoff-Handbuch (Plastics Handbook)" vol. 10, 2nd edition, Carl-Hanser-Verlag, Munich 1988, English abstract, 2 pages total.
English Translation of International Preliminary Examination Report of PCT/EP01/14582, dated Mar. 18, 2003.
Derwent Abstract 196801, DE 1 250 584, Published Sep. 21, 1967.
Patent Abstracts of Japan, Publication No. 52-33931, dated Mar. 15, 1977, in the name of Furusuwa et al.
Patent Abstracts of Japan, Publication No. 58-217424, dated Dec. 17, 1983, in the name of Kosuke Shimazu.
Patent Abstracts of Japan, Publication No. 04-335045, dated Nov. 24, 1992, in the name of Takahiro Nakawa et al.
Patent Abstracts of Japan, Publication No. 4-305005, dated Oct. 28, 1992, in the name of Yoshioka.
Patent Abstracts of Japan, Publication No. 11-323106, dated Nov. 26, 1999, in the name of Noriyuki Suzuki.
Patent Abstracts of Japan, Publication No. 2000-191925, dated Jul. 11, 2000, in the name of Tsuda.
Bjuller, Teplo-i Termostoikie Polimery, pp. 565-586, with partial English translation.
G. Lagaly "Characterization of Clays By Organic Compounds", Clay Minerals, vol. 16, 1981, pp. 1-21.
R. Mülhaupt, et al., "PP-Compounds als Konstruktions-werkstoffe", Kunststoffe, vol. 87, No. 4, 1997, pp. 482-486, with partial English translation.
J.W. Gilman, et. al., "Flammability Studies of Polymer Layered Silicate Nanocomposites: Polyolefin, Epoxy, and Vinyl Ester Resins", Chapter 14, National Institute of Standards and Technology, pp. 249-265.
B. Mertschenk, et al., Thiorurea and Thiourea Derivatives, Wiley-VCH Verlag GmbH & Co. KgaA, 2005, pp. 1-14.
I. Ammelide, "Ammelide, Ammeline and Related Compounds", Chapter V, pp. 269-307.

* cited by examiner

PROCESS FOR CURING AMINOPLAST RESINS

CROSS-REFERENCE TO RELATED APPLICATION

This application is a National Phase Patent Application of International Application Number PCT/EP01/14582, filed on Dec. 12, 2001, which claims priority of Austrian Patent Application Number A 2088/2000, filed Dec. 15, 2000.

BACKGROUND OF THE INVENTION

1. Field of the Invention

The invention relates to a process for curing aminoplast resins having improved toughness, and aminoplast resins cured in this manner.

2. Description of Related Art

Semifinished products and moldings of aminoplasts, such as compression moldings, injection moldings, profiles, fibers, foams, coatings and laminates, are known (Ullmann's Encyclopedia of Industrial Chemistry, 4th edition, Vol. A2, 115–141). A disadvantage of the semifinished products and moldings of aminoplasts is their poor toughness.

A number of processes for improving the toughness of semifinished products and moldings of aminoplasts are known.

Moldings of melamine resins having a high toughness are obtained by means of melamine resin formulations in which some of the melamine component is replaced by melamine substituted by hydroxyoxyalkyl groups (EP 0 408 947), or by means of incorporation of glycols into the melamine resin (EP 0 149 652). In the preparation of melamine resin foams, an improvement in the toughness is achieved if foaming and crosslinking are effected by exposure to microwave radiation (EP 0 037 470). The brittleness of melamine resin laminates is reduced by using melamine resins which contain dicyandiamide and polyalcohols incorporated into the melamine resin component (WO 96 20 230).

In the preparation of foams based on urea resins, foams having improved toughness are obtained if urea resins modified with polyalcohols, such as pentaerythritol, arabitol or sorbitol (DAS 1 054 232) or with polyethylene glycols (U.S. Pat. No. 2,807,595) are used.

A disadvantage of these processes is that the increase in the toughness is associated with a decrease in the strength of the semifinished products and moldings.

The toughness of semifinished products and moldings of aminoplasts is furthermore determined by the curing agents used and the degree of curing. Known curing agents for aminoplasts are p-toluenesulfonic acid, naphthalenesulfonic acid, phthalic acid, maleic acid and amine and ammonium salts of inorganic acids (Woebcken, W., Kunststoff-Handbuch [Plastics Handbook], Vol. 10, 2nd edition, Carl-Hanser-Verlag, Munich 1988). The possibilities for improving the toughness of aminoplasts with control of the course of curing by curing temperature and pH range are, however, limited.

SUMMARY

It has surprisingly been found that aminoplasts having high toughness and strength can be prepared by using curing agents comprising inorganic particles having a layer structure which have an interlamellar content of exchangeable cations.

The invention accordingly relates to a process for curing aminoplast resins, which is characterized in that inorganic particles having a layer structure which have an interlamellar content of exchangeable cations of the type consisting of alkali metal, alkaline earth metal, aluminum, iron and/or manganese cations are used as the curing agent.

DETAILED DESCRIPTION

In one embodiment, the aminoplast resins and the semifinished products and moldings produced therefrom contain, as curing agents, from 1 to 30% by mass, based on the semifinished products and moldings, of inorganic particles having a layer structure which have an interlamellar content of exchangeable cations of the type consisting of alkali metal, alkaline earth metal, aluminum, iron and/or manganese cations, it being possible for the semifinished products and moldings optionally to contain, based in each case on the aminoplast resins, from 20 to 5 000% by mass of sheet-like substrate materials, from 1 to 400% by mass of fillers and/or reinforcing materials, from 0.1 to 5% by mass of polymeric dispersants and/or from 0.1 to 5% by mass of customary additives.

The semifinished products and moldings are preferably compression moldings, injection moldings, profiles, microcapsules, fibers, closed-cell or open-cell foams, coatings, laminates or impregnated sheet-like substrate materials.

Preferred aminoplast resins are melamine resins, urea resins, cyanamide resins, dicyandiamide resins, guanamine resins, sulfonamide resins and/or aniline resins.

Preferred melamine resins are polycondensates of melamine or melamine derivatives and $C_1$–$C_{10}$-aldehydes having a molar melamine or melamine derivative/$C_1$–$C_{10}$-aldehydes ratio of from 1:1 to 1:6 and the partial etherification products thereof with $C_1$–$C_{10}$-alcohols, the melamine derivatives being in particular melamines, diaminomethyltriazines and/or diaminophenyltriazines substituted by hydroxy-$C_1$–$C_{10}$-alkyl groups, hydroxy-$C_1$–$C_4$-alkyl(oxa-$C_2$–$C_4$-alkyl)$_{1-5}$ groups and/or by amino-$C_1$–$C_{12}$-alkyl groups, particularly preferably 2-(2-hydroxyethylamino)-4,6-diamino-1,3,5-triazine, 2-(5-hydroxy-3-oxapentylamino)-4,6-diamino-1,3,5-triazine and/or 2,4,6-tris(6-aminohexylamino)-1,3,5-triazine ammeline, ammelide, melem, melon, melam, benzoguanamine, acetoguanamine, tetramethoxymethyl-benzoguanamine, caprinoguanamine and/or butyroguanamine, and the $C_1$–$C_{10}$-aldehydes being in particular formaldehyde, acetaldehyde, trimethylolacetaldehyde, acrolein, furfurol, glyoxal and/or glutaraldehyde, particularly preferably formaldehyde.

The melamine resins may likewise contain from 0.1 to 10% by mass, based on the total mass of the melamine and melamine derivatives, of incorporated phenols and/or urea. Suitable phenol components include phenol, $C_1$–$C_9$-alkylphenols, hydroxyphenols and/or bisphenols.

Examples of partial etherification products of melamine resins with $C_1$–$C_{10}$-alcohols are methylated and butylated melamine resins.

Examples of the urea resins optionally contained as aminoplasts in the semifinished products or moldings can also be cocondensates with phenols, acid amides or sulfonamides, in addition to urea/formaldehyde resins.

Examples of the sulphonamide resins optionally contained as aminoplasts in the semifinished products or moldings are sulfonamide resins of p-toluenesulfonamide and formaldehyde.

Examples of guanamine resins optionally contained as aminoplasts in the semifinished products or moldings are resins which contain, as a guanamine component, benzoguanamine, acetoguanamine, tetramethoxymethylbenzoguanamine, caprinoguanamine and/or butyroguanamine.

Examples of the aniline resins optionally contained as aminoplasts in the semifinished products or moldings are aniline resins which, in addition to aniline, may also contain toluidine and/or xylidenes as aromatic diamines.

The inorganic particles having a layer structure and contained in the semifinished products and moldings of aminoplasts are preferably silicates, phosphates, arsenates, titanates, vanadates, niobates, molybdates and/or manganates, particularly preferably sheet silicates of the type consisting of montmorillonite, bentonite, kaolinite, muscovite, hectorite, fluorohectorite, kanemite, revdite, grumantite, ilerite, saponite, beidelite, nontronite, stevensite, laponite, taneolite, vermiculite, halloysite, volkonskoite, magadite, rectorite, halloysite, kenyaite, sauconite, borofluorophlogopites and/or synthetic sheet silicates.

Examples of suitable phosphates having a layer structure are compounds of the formula $H_2[M^{IV}(PO_4)_2].xH_2O$ ($M^{IV}$=Zr, Ti, Ge, SN, Pb) and $CaPO_4R.H_2O(R=CH_3; C_2H_5)$.

Examples of suitable arsenates having a layer structure are compounds of the formula $H_2[M^{IV}(AsO_4)_2].xH_2O$ and $H[Mn(AsO_4)_2].xH_2O$.

Examples of suitable titanates having a layer structure are compounds of the formula $Na_4Ti_9O_{20}.xH_2O$ and $K_2Ln_2Ti_3O_{10x}H_2O$.

Synthetic sheet silicates are obtained, for example, by reacting natural sheet silicates with sodium hexafluorosilicate.

Particularly preferred sheet silicates are those whose layers have an interlayer spacing of from about 0.4 nm to 1.5 nm.

Preferred sheet-like substrate materials which may be contained in the semifinished products and moldings according to the invention are paper, board, wood products, wood fiber boards, wood chip boards, woven glass fiber fabrics, nonwovens, woven textile fabrics, plastics films, plastics sheets, sheet-like plastics parts, metal foils and sheet-like metal parts, such as bodywork parts in the automotive sector or covers in apparatus construction and mechanical engineering.

Fillers which may be contained in the semifinished products or moldings according to the invention are $Al_2O_3$, $Al(OH)_3$, barium sulfate, calcium carbonate, glass beads, silica, mica, quartz powder, slate powder, hollow microspheres, carbon black, talc, crushed rock, woodmeal, cellulose powder and/or shell flours and kernel flours, such as peanut shell flour or olive kernel flour.

Examples of reinforcing materials which may be contained in the semifinished products or moldings according to the invention are wood fibers, cellulose fibers, flax, jute and kenaf.

Preferred reinforcing materials are inorganic fibers, in particular glass fibers and/or carbon fibers, natural fibers, in particular cellulose fibers, and/or plastics fibers, in particular fibers of polyacrylonitrile, polyvinyl alcohol, polyvinyl acetate, polypropylene, polyesters and/or polyamides.

Preferred polymeric dispersants which may be contained in the semifinished products or moldings according to the invention are water-soluble, water-dispersible and/or water-emulsifiable polymers.

Examples of water-soluble polymers which may be contained in the semifinished products or moldings according to the invention are polyvinyl alcohol, polyacrylamide, polyvinylpyrrolidone, polyethylene oxide, methylcellulose, ethylcellulose, hydroxyethylcellulose and/or carboxymethylcellulose.

The water-dispersible or water-emulsifiable polymers optionally contained in the semifinished products and moldings according to the invention are thermoplastics, elastomers and/or waxes.

Examples of suitable thermoplastics are cellulose esters, cellulose ethers, polyvinyl acetate, polyvinyl propionate, polyacrylates, unsaturated or saturated polyesters, maleic anhydride copolymers, polypropylene oxide and/or ethylene/vinyl acetate copolymers. Preferred maleic anhydride copolymers are copolymers in which the anhydride groups have been modified by amidation and/or imidation with hydrophobic hydrocarbon constituents or by esterification with hydrophilic polyalkylene oxide substituents.

Examples of water-dispersible or water-emulsifiable elastomers are styrene/butadiene rubbers, acrylate rubbers, polyurethanes and/or fluoroelastomers.

Examples of suitable waxes are polyolefin wax oxidates, such as polyethylene wax oxidates, or waxes based on ethylene/vinyl acetate copolymers.

Particularly preferred polymeric dispersants which are optionally contained in the semifinished products and moldings according to the invention are polyvinyl alcohol, polyvinyl acetate, maleic anhydride copolymers and/or unsaturated or saturated polyesters.

The customary additives which may be contained in the semifinished products and moldings according to the invention are in particular from 0.1 to 30% by mass of flameproofing agents and/or from 0.05 to 1% by mass of stabilizers.

Examples of suitable flameproofing agents which may optionally be contained in the semifinished products or moldings are ammonium phosphate, ammonium polyphosphate, antimony trioxide, magnesium phosphate, decabromodiphenyl ether, trisdibromopropyl isocyanurate, tetrabromobisphenol-bis-dibromopropyl ether and/or tris(trisbromoneopentyl)phosphate.

Examples of suitable stabilizers which may be used in particular in coatings comprising coating resin are bis(2,2,6,6-tetramethyl-4-piperidinyl)sebacate or benzotriazole derivatives, such as 2-(2-hydroxy-3,5-di-tert-amylphenyl)-2H-benzotriazole or 2-(2-hydroxy-3-tert-butyl-5-methylphenyl)benzotriazole.

The semifinished products and moldings of aminoplasts having improved toughness are produced, according to the invention, by a process in which, by methods known per se, mixtures of aminoplast precondensates and, as a curing agent, from 1 to 30% by mass, based on the aminoplast precondensates, of inorganic particles having a layer structure which have an interlamellar content of exchangeable cations of the type consisting of alkali metal, alkaline earth metal, aluminum, iron and/or manganese cations, in the form of aqueous dispersions or emulsions having a solids content of from 30 to 80% by mass, which may optionally contain up to 50% by mass of $C_1$–$C_8$-alcohols, from 0.1 to 5% by mass of polymeric dispersants and from 0.01 to 3% by mass of detergents, are shaped and cured after drying and subsequent thermal processing of the molding materials by compression molding, injection molding, melt spinning or extrusion to give compression moldings, injection moldings, filaments or profiles, or are processed after concentration of the aqueous solutions by centrifugal spinning, filament drawing, extrusion or fibrillation processes, optionally with subsequent orientation, and curing to give aminoplast fibers, or are processed by introduction into an emulsifier-free aqueous dispersion of solid or liquid capsule core formers, curing and spray-drying to give microcapsules, or are processed by introduction into an emulsifier-free aqueous dispersion of volatile hydrocarbons, inert gases and/or inorganic carbonates and discharge of the hollow particles either into molds and curing to give closed-cell foams or by means of a mold and curing to give closed-cell foamed profiles, or by introduction into an aqueous blowing agent emulsion of volatile hydrocarbons, inert gases and/or inorganic carbonates, heating to the boiling point or decomposition temperature of the blowing agent and discharge either into molds and curing to give open-cell foams or by means of a mold and curing to give open-cell foamed profiles, or are processed after formulation to give coating resin solutions or coating resin dispersions and by subsequent application of the coating resin solutions or coating resin dispersions to sheet-like substrate materials, drying and curing to give coatings comprising coating resin, or after formulation to give impregnating resin solutions or impregnating resin dispersions, are subsequently processed by impregnation of sheet-like substrate materials, lamination and curing to give laminates, it being possible to add, in each case based on the aminoplasts, from 1 to 400% by mass of fillers and/or reinforcing materials and/or from 0.1 to 5% by mass of customary additives before and/or during the processing to give semifinished products or moldings.

The customary additives which may be used in the process according to the invention for the production of semifinished products and moldings of aminoplasts having improved toughness may be from 0.1 to 3% by mass, preferably from 0.1 to 0.6% by mass, of surfactants, from 0.1 to 2% by mass of lubricants, from 0.1 to 30% by mass of flameproofing agents and/or from 0.05 to 1% by mass of stabilizers.

Surfactants which may be used in the process for the production of semifinished products and moldings are saturated or unsaturated $C_{12}$–$C_{22}$-hydrocarbons having hydroxyl and/or carboxyl groups, anionic surfactants, cationic surfactants or nonionic surfactants.

Examples of saturated $C_{12}$–$C_{22}$-hydrocarbons having hydroxyl and/or carboxyl groups are lauric acid, stearic acid, behenic acid, lauryl alcohol, stearyl alcohol and behenyl alcohol.

Examples of unsaturated $C_{12}$–$C_{22}$-hydrocarbons having hydroxyl and/or carboxyl groups are linoleic acid, linolenic acid, eleostearic acid, oleic acid, erucic acid, oleyl alcohol, elaidyl alcohol and erucyl alcohol.

Examples of anionic surfactants are metal salts, such as sodium salts of alkanesulfonates and alkylarylsulfonates having 8 to 20 C atoms in the alkyl radical, metal salts of sulfosuccinic esters, sulfonated castor oils, alkylnaphthalenesulfonic acids, phenolsulfonic acids and sulfuric esters, such as $C_{12}$–$C_{18}$-alkyl hydrogen sulfates or $C_{16}$–$C_{18}$ fatty alcohol sulfates.

Examples of cationic surfactants are the triethanolamine ester of oleic acid and laurylpyridinium chloride.

Examples of nonionic surfactants are ethoxylated castor oil, ethoxylated talcum fatty alcohols, ethoxylated stearic acid or oleic acid and ethoxylated nonylphenol.

The formulation of the molding materials for the production of the compression moldings, injection moldings or profiles can be effected in particular by wet impregnation or dry impregnation. In the case of the wet impregnation process, the solution of the aminoplast precondensate, which contains inorganic particles having a layer structure with exchangeable cations of the type consisting of alkali metal, alkaline earth metal, aluminum, iron and/or manganese cations in interlamellar sites as a curing agent in dispersed form, is homogenized in kneaders with the fillers, such as pulp, woodmeal, textile shreds, textile fibers, paper shreds, paper fibers or glass fibers, and customary additives, such as lubricants and pigments, and dried in drying drums at temperatures of below 80° C. In the case of the dry impregnation process, comminuted solid aminoplast resins or spray-dried solid aminoplast resins, which contains inorganic particles having a layer structure with exchangeable cations of the type consisting of alkali metal, alkaline earth metal, aluminum, iron and/or manganese cations in interlamellar sites as a curing agent, are premixed in dry form with fillers, such as woodmeal or crushed rock, and customary additives, such as lubricants and pigments, and homogenized on roll mills or continuous kneaders. Preferred processing temperatures are from 140° C. to 170° C. in the case of the production of compression moldings and from 155° C. to 180° C. in the case of the production of injection moldings Suitable processing assistants which can be added as customary additives in the production of semifinished products or moldings are calcium stearate, magnesium stearate and/or waxes.

In the production of melamine resin fibers as aminoplast semifinished products, melamine is condensed with formaldehyde and/or mixtures of from 20 to 99.9% by mass of melamine and from 0.1 to 80% by mass of melamine derivatives and/or triazine derivatives, optionally with addition of from 0.1 to 10% by mass, based on the total mass of the melamine, melamine derivatives and/or triazine derivatives, of phenols, are condensed with formaldehyde, the molar melamine/formaldehyde or melamine+melamine derivative or triazine derivative/formaldehyde ratio preferably being from 1:1.0 to 1:4. The fiber production is carried out from the highly concentrated aqueous solutions of the polycondensates (solids content from 50 to 70% by mass) after addition of the inorganic particles having a layer structure, which have an interlamellar content of exchangeable cations of the type consisting of alkali metal, alkaline earth metal, aluminum, iron and/or manganese cations, as a curing agent, by centrifugal spinning, filament drawing, extrusion or fibrillation processes, optionally subsequent orientation, and curing. In the extrusion process, the spinning solution is forced through a nozzle into an atmosphere (air or inert gas) heated to 170 to 320° C., in order to remove the solvents contained in the spinning solution and to cure the fibers in as short a time as possible.

The production of microcapsules is effected by introduction of the aminoplast precondensates into an emulsifier-free aqueous dispersion of solid or liquid capsule core formers and inorganic particles having a layer structure, which have an interlamellar content of exchangeable cations of the type consisting of alkali metal, alkaline earth metal, aluminum, iron and/or manganese cations, as a curing agent, and subsequent curing and spray-drying. The use of the capsule core formers in the production of the microcapsules is determined by the field of use of the microcapsules.

Examples of solid capsule core formers are finely dispersed photographic chemicals, herbicides, pesticides, agrochemicals, pharmaceuticals, pigments, dyes, flameproofing agents, catalysts, magnetic particles and stabilizers. Examples of liquid capsule core formers are adhesives, flavors, perfumes, inks and water-dispersible liquids, such as oils.

In the preparation of the closed-cell foams or closed-cell foamed profiles as aminoplast semifinished products, it is advantageous, for obtaining a finely divided emulsifier-free aqueous dispersion of the volatile hydrocarbons and/or inert gases used, to use multiphase gas introduction pumps. From 1 to 20% by mass, based on the aminoplast precondensates used, of prepolymers based on epoxy resins, phenol resins, urea resins, melamine resins, aniline resins, resorcinol resins and/or polyester resins can be added to the hollow particles produced, before processing to give foams or profiles.

Examples of suitable volatile hydrocarbons which can be used in the production of the closed-cell or open-cell semifinished products or moldings of aminoplasts are butane, pentane, isopentane and/or hexane.

In the production of coatings comprising coating resin as aminoplast semifinished products, aminoplast precondensates are formulated with addition of inorganic particles having a layer structure with exchangeable cations of the type consisting of alkali metal, alkaline earth metal, aluminum, iron and/or manganese cations in interlamellar sites, as a curing agent, pigments, and optionally fillers, stabilizers, solvents and film formers of the type consisting of alkyd resins, epoxy resins and/or phenol resins, applied to substrate materials, such as wood, and cured at temperatures below 80° C. or applied to metallic substrate materials and cured at temperatures up to 180° C.

In the production of laminates as aminoplast semifinished products, according to the invention sheet-like substrate materials comprising organic or inorganic fibers in the form of webs, woven fabrics, mats or nonwovens, are impregnated with the aqueous solution of the aminoplast precondensate, which contain, as a curing agent, inorganic particles having a layer structure with an interlamellar content of exchangeable cations of the type consisting of alkali metal, alkaline earth metal, aluminum, iron and/or manganese cations, for example in impregnating units, and dried in drying tunnels at temperatures up to 140° C. and cured as a laminate or pressed in multiple-daylight presses after cutting and optionally introducing intermediate layers, for example made of wood, paper or board. Improved toughness of laminates is important for the subsequent thermal processability of the laminates, during which cracking must be ruled out in the case of small bending radii during the subsequent thermal processing.

The water-soluble, water-dispersible and/or water-emulsifiable polymers optionally used as polymeric dispersants can, depending on the dispersant, be employed in the form of a solution, dispersion or emulsion in water or organic solvents in the production of the semifinished products and moldings according to the invention and comprising aminoplasts.

The water-soluble, water-dispersible and/or water-emulsifiable polymers can also be formed in situ by adding, to those mixtures of aminoplast precondensates and inorganic particles having a layer structure which are present as aqueous dispersions or emulsions, before the processing to semifinished products or moldings, instead of polymeric dispersants, mixtures of ethylenically unsaturated monomers and thermal free radical initiators, from which the water-soluble, water-dispersible and/or water-emulsifiable polymers are formed. Examples of suitable ethylenically unsaturated monomers are acrylamide, vinylpyrrolidone, $C_4$–$C_{18}$-(meth)acrylic esters and/or vinyl acetate.

The semifinished products and moldings according to the invention, having improved toughness, are suitable, particularly in the form of compression moldings, injection moldings or profiles, in the electrical industry, electronics, in the kitchen and sanitary sector, in the equipment industry and in mechanical engineering; in the form of microcapsules containing solids or liquids, for photosensitive and pressure-sensitive photographic and copying paper and in pharmacy and agrochemistry; in the form of fibers, for filter materials and nonflammable textiles; in the form of closed-cell or open-cell foams, for heat and sound insulation in construction and in the vehicle industry; in the form of coatings, as baking finishes in the vehicle and equipment industry and for scratch-resistant wood coatings; in the form of impregnated sheet-like substrate materials, in the textile industry and paper industry; and in the form of laminates, in construction and in the furniture industry.

EXAMPLE 1

35 kg of 30% aqueous formalin solution, 9 kg of melamine, 3 kg of benzoguanamine and 2.5 kg of urea are introduced into a 150 liter stirred reactor, adjusted to pH=8.0 with sodium hydroxide solution and condensed at 75° C. with stirring in the course of 40 min. After cooling to room temperature, 900 g of sodium montmorillonite (Südchemie A G, Moosburg, Federal Republic of Germany) are dispersed in the solution of the aminoplast precondensate.

In a heatable kneader, a mixture of 3.3 kg of bleached sulfite cellulose, 1 kg of chalk and 120 g of magnesium stearate is impregnated with 9 l of the aminoplast solution containing sodium montmorillonite as a curing agent, homogenized, dried at 80° C., discharged and granulated, and the molding material particles are processed in a heatable press at a mold temperature of 170° C. and a pressure of 250 bar to give 4 mm sheets measuring 100×100 mm.

Cut-out test bars have the following properties:

Tensile strength: 29 MPa Flexural strength: 82 MPa

Flexural modulus of elasticity: 7 600 MPa

Impact strength: 11.0 $kJ/m^2$ Notched impact strength: 4.0 $kJ/m^2$

EXAMPLE 2

33 kg of 30% aqueous formalin solution and 10 kg of melamine and 2.2 kg of urea are introduced into a 150 l stirred reactor and condensed at 80° C. with stirring in the course of 120 min. After cooling to room temperature, 950 g of aluminum montmorillonite (prepared from sodium montmorillonite by cation exchange of sodium for aluminum) are added to the solution of the aminoplast condensate and dispersed.

In a heatable kneader, a mixture of 3.5 kg of textile shreds, 1 kg of lithopone and 120 g of calcium stearate is impregnated with 9.5 l of the aminoplast solution containing aluminum montmorillonite as a curing agent, homogenized, dried at 80° C., discharged and granulated, and the molding material particles are processed in a heatable press at a mold temperature of 170° C. and a pressure of 250 bar to give 4 mm sheets measuring 100×100 mm.

Cut-out test bars have the following properties:

Tensile strength: 31 MPa Flexural strength: 85 MPa

Flexural modulus of elasticity: 8 200 MPa

Impact strength: 12.0 kJ/m² Notched impact strength: 5.0 kJ/m²

EXAMPLE 3

30 kg of a 30% aqueous aldehyde solution comprising 9:1 formaldehyde/glyoxal, 7.5 kg of melamine, 2 kg of aniline and 2.0 kg of 2-(2-hydroxyethylamino)-4,6-diamino-1,3,5-triazine are introduced into a 150 l stirred reactor having a reflux condenser and high-speed disperser, adjusted to pH=7.0 with sodium hydroxide solution and condensed at 85° C. with stirring in the course of 30 min. After cooling to room temperature, 850 g of sodium montmorillonite (Südchemie A G, Moosburg, Federal Republic of Germany) were introduced into the solution of the aminoplast precondensate and dispersed.

For the production of the laminates, a decor paper (base weight 80 g/m²) and a kraft paper as a core paper (basis weight 180 g/m²) are impregnated at 25° C. with the solution of the aminoplast precondensate, which contains sodium montmorillonite (Südchemie A G, Moosburg, Federal Republic of Germany) as a curing agent and to which in each case 1% by mass of wetting agent and parting agent are also added.

After drying in a through-circulation oven at 140° C. to an alignment of 7.2%, the decor paper has a resin content of 55% by mass and the kraft paper a resin content of 42% by mass. Thereafter, 2 layers of the impregnated decor paper are compressed with a core paper in between in a Collin laboratory press with a pressure of 100 bar at 160° C. for 130 s.

For testing the toughness, the subsequent deformability of the resulting laminate was investigated. On bending the laminate around a 3 mm metal spindle heated to 160° C., no cracking of the laminate occurred.

The invention claimed is:

1. A method for curing an aminoplast resin comprising incorporating inorganic particles into an aminoplast condensate to form a mixture, wherein the inorganic particles have a layer structure with an interlamellar content of exchangeable cations selected from the group consisting of aluminum cations, iron cations, manganese cations, and combinations thereof; and curing the mixture, wherein the inorganic particles act as the curing agent.

2. The method for curing an aminoplast resin as claimed in claim 1, wherein the inorganic particles having a layer structure are selected from the group consisting of silicates, phosphates, arsenates, titanates, vanadates, niobates, molybdates, manganates, and combinations thereof.

3. The method for curing an aminoplast resin as claimed in claim 1, wherein the aminoplast resin is selected from the group consisting of melamine resins, urea resins, cyanamide resins, dicyandiamide resins, guanamine resins, sulfonamide resins, aniline resins, and combinations thereof.

4. The method for curing an aminoplast resin as claimed in claim 1, wherein the aminoplast resin is selected from polycondensates of melamine or melamine derivatives and $C_1$–$C_{10}$-aldehydes having a molar melamine or melamine derivative/$C_1$–$C_{10}$-aldehydes ratio of from 1:1 to 1:6 and the partial etherification products thereof with $C_1$–$C_{10}$-alcohols.

5. The method for curing an aminoplast resin as claimed in claim 4, wherein the melamine derivatives are selected from the group consisting of melamines, diaminomethyltriazines and diaminophenyltriazines substituted by hydroxy-$C_1$–$C_{10}$-alkyl groups, by hydroxy-$C_1$–$C_4$-alkyl(oxa-$C_2$–$C_4$-alkyl)-5 groups or by amino-$C_1$–$C_{12}$-alkyl groups, ammeline, ammelide, melem, melon, melam, benzoguanamine, acetoguanamine, tetramethoxymethylbenzoguanamine, caprinoguanamine and butyroguanamine, wherein the $C_1$–$C_{10}$-aldehydes are selected from the group consisting of formaldehyde, acetaldehyde, trimethylolacetaldehyde, acrolein, furfural, glyoxal and glutaraldehyde.

6. The method for curing an aminoplast resin as claimed in claim 5, wherein the $C_1$–$C_{10}$-aldehyde is selected from the group consisting of formaldehyde, acetaldehyde, trimethylolacetaldehyde, acrolein, furfural, glyoxal, glutaraldehyde, and combinations thereof.

7. The method for curing an aminoplast resin as claimed in claim 1, wherein the inorganic particles having a layer structure are sheet silicates selected from the group consisting of montmorillonite, bentonite, kaolinite, muscovite, hectorite, fluorohectorite, kanemite, revdite, grumantite, ilerite, saponite, beidelite, nontronite, stevensite, laponite, taneolite, vermiculite, volkonskoite, magadite, rectorite, halloysite, kenyaite, sauconite, borofluorophlogopites, synthetic sheet silicates, and combinations thereof.

8. A method for curing an aminoplast resin comprising a polycondensate of a melamine derivative and an aldehyde provided in a melamine derivative/aldehyde molar ratio from 1:1 to 1:6, the method comprising incorporating inorganic particles into an aminoplast condensate to form a mixture and curing the mixture, wherein the inorganic particles have a layer structure with an interlamellar content of exchangeable cations selected from the group consisting of aluminum cations, iron cations, manganese cations, and combinations thereof, the aldehyde is selected from the group consisting of formaldehyde, acetaldehyde, trimethylolacetaldehyde, acrolein, furfural, glyoxal and glutaraldehyde, and the melamine derivative is selected from the group consisting of 2-(2-hydroxyethylamino)-4,6-diamino-1,3,5-triazine, 2-(5-hydroxy-3-oxapentylamino)-4,6-diamino-1,3,5-triazine, 2,4,6-tris(6-aminohexylamino)-1,3,5-triazine, and combinations thereof.

9. An aminoplast resin cured with the aid of inorganic particles having a layer structure, which have an interlamellar content of exchangeable cations selected from the group consisting of aluminum cations, iron cations, manganese cations, and combinations thereof.

10. The cured aminoplast resin as claimed in claim 9, wherein the cured aminoplast resin is in the form of a compression molding, injection molding, profile, microcapsule, fiber, closed-cell or open-cell foam, coating, laminate or impregnated sheet-like substrate material.

11. A process for the preparation of aminoplast resins having improved toughness, wherein the aminoplast resins are cured with inorganic particles having a layer structure, and which have an interlamellar content of exchangeable cations selected from the group consisting of aluminum cations, iron cations, manganese cations, and combinations thereof, in the form of aqueous dispersions or emulsions having a solids content of 30–80% by mass, which may optionally contain: up to 50% by mass of $C_1$–$C_8$-alcohols; from 0.1–5% by mass of polymeric dispersants; and from 0.01 to 3% by mass of detergents; are added to a mixture of aminoplast precondensate and are shaped and cured after drying and subsequent thermal processing of the molding materials by compression molding, injection molding, melt spinning or extrusion to give compression moldings, injection moldings, filaments or profiles, or are processed after concentration of the aqueous solutions by centrifugal spinning, filament drawing, extrusion or fibrillation processes, optionally with subsequent orientation, and curing to give aminoplast fibers, or are processed by introduction into an emulsifier-free aqueous dispersion of solid or liquid capsule core formers, curing and spray-drying to give microcapsules, or are processed by introduction into an emulsifier-free aqueous dispersion of volatile hydrocarbons, insert gases and/or inorganic carbonates and discharge of the hollow particles either into molds and curing to give closed-cell foams or by means of a mold and curing to give closed-cell foamed profiles, or are introduced into an aqueous blowing agent emulsion of volatile hydrocarbons, inert gases and/or inorganic carbonates, heated to the boiling point or decomposition temperature of the blowing agent and discharged either into molds and cured to give open-cell foams or by means of a mold and curing to give open-cell foamed profiles, or are processed after formulation to give coating resin solutions or coating resin dispersions and by subsequent application of the coating resin solutions or coating resin dispersions to sheet-like substrate materials, drying and curing to give coatings comprising coating resin, or after formulation to give impregnating resin solutions or impregnating resin dispersions, are subsequently processed by impregnation of sheet-like substrate materials, lamination and curing to give laminates, and optionally adding, in each case based on the aminoplasts, from 1 to 400% by mass of fillers and/or reinforcing materials and/or from 0.1 to 5% by mass of customary additives before and/or during the processing.

* * * * *